United States Patent
Kirby

[11] 3,799,285
[45] Mar. 26, 1974

[54] SEISMIC ENERGY SOURCE
[75] Inventor: Robert Andrew Kirby, Houston, Tex.
[73] Assignee: Esso Production Research Company, Houston, Tex.
[22] Filed: June 6, 1973
[21] Appl. No.: 367,671

[52] U.S. Cl............................................. 181/.5 NC
[51] Int. Cl............................................. G01v 1/10
[58] Field of Search .......... 181/.5 NC, .5 XC, .5 A, 181/33 C, 39, 36 E; 340/3 T, 125 D, 7 R

[56] References Cited
UNITED STATES PATENTS
| | | | |
|---|---|---|---|
| 3,744,020 | 7/1973 | Kirby | 181/.5 NC |
| 3,620,327 | 11/1971 | Savit | 181/.5 NC |
| 3,415,245 | 12/1968 | Yamamato | 181/39 |
| 3,658,149 | 4/1972 | Neal | 181/.5 NC |

Primary Examiner—Benjamin A. Borchelt
Assistant Examiner—J. V. Doramus
Attorney, Agent, or Firm—John B. Davidson

[57] ABSTRACT

A seismic energy source comprises a plurality of inflatable chambers supported on heat conductive members adapted to be cooled by the flow therethrough of liquid in the medium in which the source is to operate. The sources are connected to a gas mixing and ignition chamber through a plurality of conduits of substantially equal length, preferably having diameters in the range 0.2 to 1.5 centimeters. Each chamber is associated with an individual exhaust conduit having different lengths and preferably having different diameters. Preferably no two of the lengths of the exhaust conduits are the same, and preferably no two of the diameters of the exhaust conduits are the same.

5 Claims, 3 Drawing Figures

SEISMIC ENERGY SOURCE

BACKGROUND OF THE INVENTION

This invention relates generally to seismic exploration and more particularly to a seismic source wherein an explosive, gaseous mixture is detonated within an expansible chamber.

Since 1967, seismic exploration as practiced at marine locations has increasingly made use of nondynamite seismic sources. One of the more successful of the sources makes use of the detonation of an explosive gaseous mixture within the confines of an expansible chamber. This type of seismic source is described in U.S. Pat. No. 3,480,101 — A. Barry et al.

Since 1970 it has become increasingly desirable to use seismic sources capable of generating seismic energy predominantly at frequencies above 50 Hz, and preferably above 100 Hz. The type of seismic energy source described in U.S. Pat. No. 3,480,101 is a very satisfactory source for energy above 100 Hz, particularly if the dimensions of the source are limited to about 4 inches in diameter and about 25 inches in length. Since the amount of energy that the source is capable of producing is determined largely by its dimensions, a number of such sources should be used in order to produce sufficient energy for practical seismic exploration purposes. The sources should be actuated at precisely the same time, particularly when the frequencies of interest are above 100 Hz. When the seismic sources in an array are not actuated at exactly the same time, the composite seismic pulse is broadened and the average frequency of the spectrum of frequencies produced thereby is reduced. Therefore it is desirable that the instant of detonation of the seismic sources be controlled as precisely as possible.

One characteristic of all seismic sources is that they produce secondary oscillations, commonly termed "bubble pulses," after the production of a main, high amplitude pulse. It is desirable whenever possible to minimize the amplitude of such bubble pulses. In the type of seismic energy source described in U.S. Pat. No. 3,480,101, a small secondary or bubble pulse is produced by the recompression of the water when the water initially compressed and displaced by the initial main high amplitude pulse rushes back into the volume of reduced pressure in the water caused by the outward afterflow of the water and the contraction of the elastic sleeve after the completion of detonation. Also, when the sleeve strikes the cage or framework, a small secondary pulse is produced. It is desirable to eliminate these secondary oscillations or bubble pulses insofar as is possible.

SUMMARY OF THE INVENTION

In accordance with the present invention, a seismic source comprises a plurality of expansible chambers into which an explosively combustible gas may be injected. There is also provided a common mixing chamber for the explosively combustible gas including means for igniting the gas within the mixing chamber. A plurality of conduits of substantially the same length connect the mixing and ignition chamber to each of the expansible chambers. Exhaust of gases from the chambers is provided through conduit means of different diameters, and preferably of different lengths. The various chambers may be exhausted into a common header connected to a conduit to the atmosphere, or may be injected into the surrounding water.

Objects and features of the invention not apparent from the above discussion will become evident upon consideration of the following detailed description of an embodiment thereof, when considered in connection with the accompanying drawings which should be taken by way of illustration only and not by way of limitation.

BRIEF DESCRIPTION OF AN EMBODIMENT OF THE INVENTION

Figure 1:
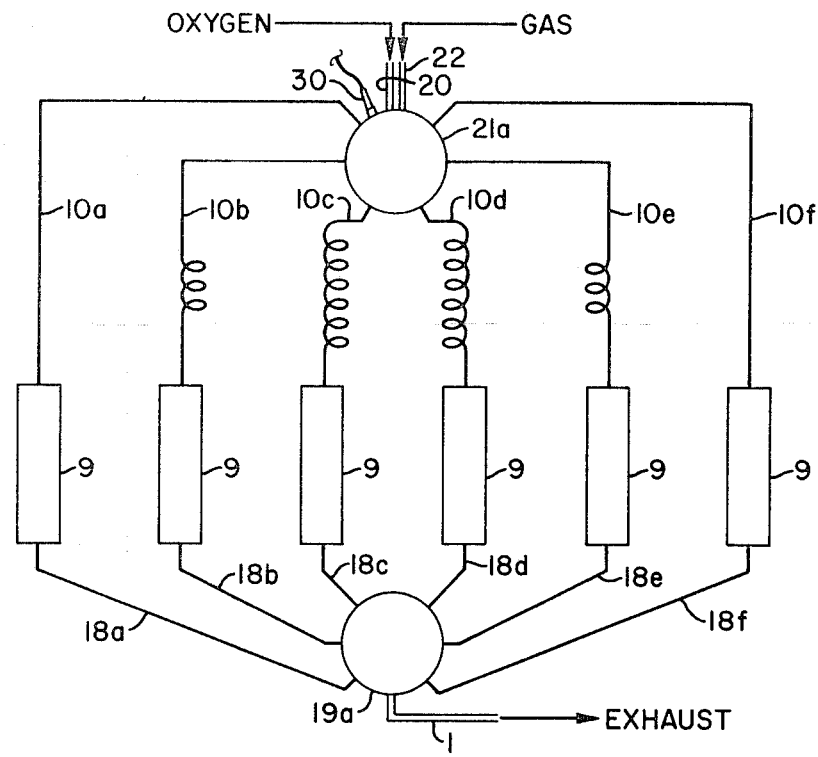
FIG. 1 is a schematic representation of a plurality of seismic sources and the gas ignition apparatus therefor in accordance with the invention.

With reference to FIG. 1, wherein is illustrated a schematic diagram of an embodiment of the invention, there is shown a plurality of seismic energy sources 9, preferably of the type described and illustrated in U.S. Pat. No. 3,480,101. This type of seismic energy source comprises a framework having a plurality of conduits passing therethrough for promoting the flow of cooling water from the surrounding liquid medium, to which is affixed an elongated sleeve of an expansible, inflatable material such as rubber so as to form an expansible combustion chamber, means for passing an explosively combustible fluid (such as a mixture of propane and oxygen) into the interior of the sleeve, and means for permitting the flow of exhausted gases from the interior of the source. The seismic energy source described in U.S. Pat. No. 3,480,101 also has built into the device a spark plug means for igniting the gas within the device; however this construction is modified in the present invention for reasons that will become apparent below.

The apparatus of FIG. 1 makes use of a common ignition chamber 21a which is connected to the various seismic energy sources 9 through small diameter lines 10a, 10b, 10c, 10d, 10e, and 10f, each line leading to one of the seismic energy sources. An explosively combustible gas is fed into the mixing and ignition chamber 21a through line 22 and oxygen is fed thereinto through line 20. An ignition device, such as a spark plug 30, is attached to the mixing and ignition chamber 21a. Exhaust conduits 18a, 18b, 18c, 18d, 18e, and 18f lead from the seismic energy sources 9 to a header 19a connected to an exhaust line 1 venting to the atmosphere. The lines 10a, 10b . . . 10f are all of substantially the same overall length. If necessary, a number of loops or corkscrew turns can be built into the lines so as to shorten the physical space occupied thereby while maintaining the lines of the same overall length. Preferably the lines 18a, 18b . . . 18f are of a multiplicity of different lengths. Most preferably, no two of the lines 18a, 18b . . . 18f are of the same length. Also the lines preferably are of a multiplicity of different diameters, and preferably no two of the lines have the same diameter. The diameters of the lines 18a, 18b . . . 18f may be between 0.2 and 1.5 centimeters.

The operation of the apparatus described above with respect to FIG. 1 is as follows: Initially, a combustible gas and oxygen are injected into the mixing and ignition chamber 21a and through the lines 10a, 10b . . . 10f into the seismic energy sources 9 to purge the seismic energy sources of any gases that happen to have been previously therewithin. The ignition device 30 is then activated to explosively ignite the gases within the combustion chamber 21a. Flame fronts will proceed from the combustion chamber through each of the lines 10a, 10b . . . 10f at the same velocity and will arrive concomitantly at the various seismic energy sources 9. Since the flame fronts arrive at substantially the same instant at each of the seismic energy sources, the gas therewithin will be simultaneously ignited so that the energy pulses produced thereby will occur simultaneously and will reinforce each other. The elastic sleeves will expand outwardly but, because of the differences in lengths and diameters of the lines 18a, 18b . . . 18f, the sleeves will contract at different rates. Therefore the secondary or bubble pulses produced thereby will occur at different instants of time and, instead of reinforcing each other, will tend to at least partially cancel each other. When the seismic energy has been produced by the sources, gas and oxygen are again flowed through the mixing and ignition chamber, the various lines and the seismic sources to repeat the cycle described above.

Figure 2:
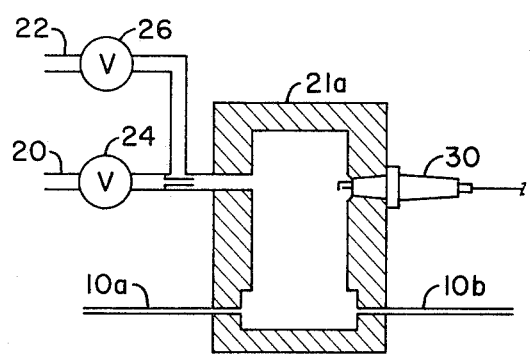
FIG. 2 is a cross-sectional representation of a suitable mixing and ignition chamber for the apparatus of FIG. 1.

In FIG. 2 there is illustrated a mixing and ignition chamber and valving arrangement suitable for use with the invention. The mixing and ignition chamber 21a is illustrated as comprising a housing having an interior space into which protrudes a spark plug 30 for igniting gases therewithin. An explosively combustible mixture is produced from propane or other explosively combustible gas being fed through line 22 controlled by electromagnetically actuated valve 26, and oxygen from line 20 controlled by electromagnetically actuated valve 24. A constriction in the line through which the oxygen is fed at its intersection with line 22 insures good mixing of the gases entering the combustion chamber. Lines 10a, 10b . . . 10f shown in FIG. 1 lead from the combustion chamber to the various seismic sources.

Figure 3:
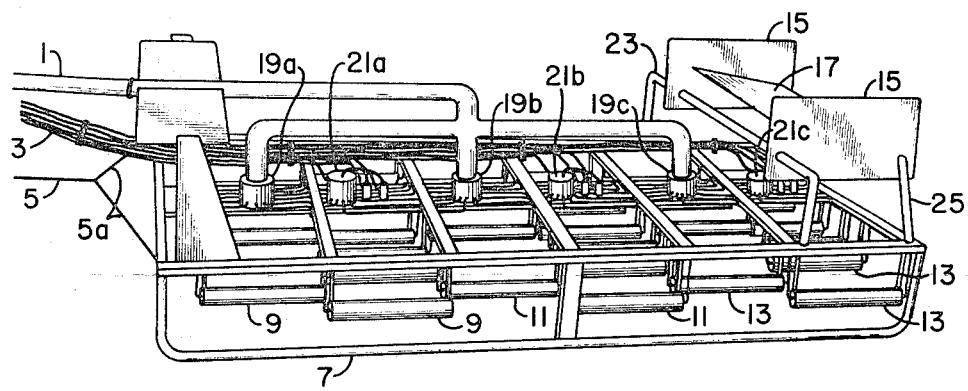
FIG. 3 is an isometric view of an embodiment of the invention such as may be towed from a seismic boat.

In FIG. 3 there is illustrated a plurality of apparatus assemblies such as shown in FIG. 1 connected together on a common framework adapted to be towed behind a seismic boat at predetermined depths in a liquid medium such as the sea. A framework 7 is provided from which are suspended a multiplicity of seismic source arrays 9, 11, and 13. Preferably the sources are parallel and are in the same horizontal plane. As will be appreciated, the array including the seismic sources 9 was described with respect to FIG. 1. A multiplicity of lines 3 are banded together leading to the seismic boat within which are included the various lines 22 for conducting explosively combustible gas from the boat and lines 20 for conducting oxygen from the boat. Also included in the banding arrangement are electrical conductors for electrical energy to actuate the spark plugs and ignite the gases within the various mixing and ignition chambers 21a, 21b, and 21c. The mixing and ignition chambers 21a, 21b, and 21c are respectively connected to the seismic energy sources in the arrays 9, 11, and 13 through conduits having substantially the same length as described above with respect to FIG. 1. These lines are not designated by reference numerals to avoid cluttering the drawing. Likewise lines from the seismic energy sources in the arrays are connected to headers 19a, 19b, and 19c which lead to the conduit 1 going to the atmosphere. These lines are of different lengths and preferably of different diameters. For the purpose of stabilizing the structure and maintaining it at a given depth in the water there are provided rudders 15 and an elevator 17 supported by braces 23 and 25. A bridle 5a leading to a towing line 5 is provided for towing the structure from a seismic boat.

Although the embodiments disclosed in the preceding specification are preferred, other modifications will become apparent to those skilled in the art which do not depart from the scope of the broadest aspects of the invention.

I claim:

1. In seismic energy generating apparatus including a plurality of expansible chambers for receiving a combustible gas, the improvement comprising:

a common mixing and ignition chamber for receiving and igniting the gas, and a plurality of elongated conduits of substantially the same length, each conduit providing fluid communication between said mixing and combustion chamber and one of the expansible chambers, and fluid exhaust conduits of a plurality of different lengths providing exhaust from said expansible chambers.

2. The apparatus of claim 1 wherein said fluid exhaust conduits are of a plurality of different inner diameters.

3. The apparatus of claim 1 wherein no two of the fluid exhaust conduits are of the same length.

4. The apparatus of claim 2 wherein no two of the fluid exhaust conduits are of the same inner diameter.

5. The apparatus of claim 2 wherein said diameters are between 0.2 and 1.5 centimeters.

* * * * *